US007003398B2

(12) United States Patent
Seligmann

(10) Patent No.: US 7,003,398 B2
(45) Date of Patent: Feb. 21, 2006

(54) DETERMINING DEPARTURE TIMES FOR TIMETABLE-BASED TRIPS

(75) Inventor: Doree Duncan Seligmann, New York, NY (US)

(73) Assignee: Avaya Technology Corp., Basking Ridge, NJ (US)

( * ) Notice: Subject to any disclaimer, the term of this patent is extended or adjusted under 35 U.S.C. 154(b) by 197 days.

(21) Appl. No.: 10/785,302

(22) Filed: Feb. 24, 2004

(65) Prior Publication Data

US 2005/0187703 A1 Aug. 25, 2005

(51) Int. Cl.
*G01C 21/00* (2006.01)

(52) U.S. Cl. ....................... 701/201; 701/204; 340/994

(58) Field of Classification Search ................ 340/988, 340/994; 701/204, 201, 200
See application file for complete search history.

(56) References Cited

U.S. PATENT DOCUMENTS

| | | | | |
|---|---|---|---|---|
| 5,563,608 | A | 10/1996 | Tachita et al. | |
| 5,959,577 | A | 9/1999 | Fan et al. | |
| 5,987,377 | A | 11/1999 | Westerlage et al. | |
| 6,006,159 | A * | 12/1999 | Schmier et al. | 701/200 |
| 6,317,686 | B1 | 11/2001 | Ran | |
| 6,510,384 | B1 * | 1/2003 | Okano | 701/209 |
| 2004/0054549 | A1 * | 3/2004 | Chittenden et al. | 705/1 |
| 2004/0260470 | A1 * | 12/2004 | Rast | 701/300 |

* cited by examiner

*Primary Examiner*—Gary Chin
(74) *Attorney, Agent, or Firm*—DeMont & Breyer, LLC

(57) ABSTRACT

A method and apparatus for enabling the advantageous selection of a departure time for a trip based on one or more timetables are disclosed. The illustrative embodiment employs a penalty function that considers: (i) whether or not the user arrives late, and if so, how late, and (ii) whether or not the user arrives early, and if so, how early, and (iii) the total travel time. The penalty function is evaluated for each entry of each trip segment timetable, and the departure time is selected in order to minimize the penalty.

20 Claims, 8 Drawing Sheets

Timetable 100

| | RED BANK | | MADISON SQUARE GARDEN | |
|---|---|---|---|---|
| • • • | • • • | • • • | • • • | • • • |
| • • • | 6:05 PM | • • • | 7:19 PM | • • • |
| • • • | 6:36 PM | • • • | 7:52 PM | • • • |
| • • • | 7:10 PM | • • • | 8:22 PM | • • • |
| • • • | 7:47 PM | • • • | 8:55 PM | • • • |
| | • • • | | • • • | |

FIG. 1 (PRIOR ART)

FIG. 2

Timetable 200

| | RED BANK | | | | MADISON SQUARE GARDEN | | | |
|---|---|---|---|---|---|---|---|---|
| | ⋮ | ⋮ | ⋮ | | ⋮ | ⋮ | ⋮ | |
| • • • | 6:03 PM | 6:05 PM | 6:07 PM | • • • | 1:12 | 1:14 | 1:23 | • • • |
| • • • | 6:34 PM | 6:36 PM | 6:38 PM | • • • | 1:15 | 1:16 | 1:26 | • • • |
| • • • | 7:09 PM | 7:10 PM | 7:11 PM | • • • | 1:10 | 1:12 | 1:16 | • • • |
| • • • | 7:45 PM | 7:47 PM | 7:51 PM | • • • | 1:07 | 1:08 | 1:20 | • • • |
| | ⋮ | ⋮ | ⋮ | | ⋮ | ⋮ | ⋮ | |

Flowchart 800

DETERMINING DEPARTURE TIMES FOR TIMETABLE-BASED TRIPS

CROSS-REFERENCE TO RELATED APPLICATIONS

The following patent application is incorporated by reference U.S. patent application Ser. No. 10/287151, filed 4 Nov. 2002, entitled "Intelligent Trip Status Notification".

FILED OF THE INVENTION

The present invention relates to transportation in general, and, in particular, to methods of determining desirable departure times for trips based on one or more timetables.

BACKGROUND OF THE INVENTION

Some modes of transportation, such as trains, buses, and airplane shuttles enable a user to travel from a first location to a second location (e.g., from a departure airport to a destination airport, from a first train station to a second train station, etc.) in accordance with a timetable that comprises a plurality of departure and arrival times. When traveling by such modes of transportation, a user typically decides which particular train, bus, airplane flight, etc. to take based on the desired time-of-arrival at the destination.

For example, a hockey fan who is in Red Bank, N.J. might wish to see a 8:00 PM Rangers hockey game at Madison Square Garden and might decide to travel to the game by train. Typically, the hockey fan will choose a particular train (e.g., the 6:36 PM North Jersey Coast train, etc.) from a timetable so that he or she will arrive at Madison Square Garden at a "good" time. A "good" time might depend on the preferences of the individual, but would typically be sometime before 8:00 PM, and not too much before 8:00 PM (for example, arriving at 4:00 PM would generally be considered undesirable, and probably worse than arriving at 8:10 PM).

FIG. 1 depicts the salient portions of exemplary timetable 100 for the northbound North Jersey Coast Line train, in the prior art. As shown in FIG. 1, timetable 100 comprises a plurality of entries, each of which indicates a time at which a train is scheduled to be present at a particular station. Each row in timetable 100 thus corresponds to a particular train.

The hockey fan might take into account historical schedule divergences when deciding which train to take. For example, in the above example, the typical delays for a train scheduled to leave Red Bank at 6:36 PM and arrive at Madison Square Garden at 7:52 PM might be such that the expected arrival time is actually sometime between 7:49 PM and 8:10 PM. Based on this information, a hockey fan might prefer to take an earlier train that is scheduled to leave at 6:05 PM and arrive at 7:19 PM, with an actual arrival time sometime between 7:18 PM and 7:37 PM.

In a more complex example, such as when the hockey fan must first drive five miles from his or her house to the Red Bank train station, the hockey fan decides (i) which train to take, as well as (ii) when to leave the house, based on the train timetable and an estimate of how long it will take to travel by car from the house to the train station (e.g., 10 minutes, between 10 and 20 minutes, etc.). Similarly, if the hockey fan is going to a concert at Carnegie Hall instead of a Rangers game, the hockey fan should also consider the time required to get to Carnegie Hall from Madison Square Garden (which might also be based on a timetable, such as a bus schedule) when deciding which train to take from Red Bank.

As illustrated by the above examples, it can be difficult for a hockey fan to decide which train, bus, etc. to select from a timetable when a trip comprises a plurality of segments, or when the arrival time can be affected by factors such as schedule divergences, weather, traffic, etc. Often the hockey fan miscalculates and arrives late, or is so apprehensive about arriving late that he or she arrives much too early.

SUMMARY OF THE INVENTION

The present invention enables the advantageous selection of a departure time for a trip based on one or more timetables. In particular, the illustrative embodiment employs a penalty function that considers:

(i) whether or not the user arrives late, and if so, how late, and (ii) whether or not the user arrives early, and if so, how early, and (iii) the total travel time.

The penalty function is evaluated for each entry of each trip segment timetable, and the departure time is selected in order to minimize the penalty. In the illustrative embodiment, each timetable entry for the departure point is associated with a scheduled departure time, an early departure time, and a late departure time, and each timetable entry for the destination point is associated with a scheduled travel time, a short travel time, and a long travel time. The three departure times are associated with an appropriate probability distribution (e.g., first standard deviations for a normal distribution, minimum and maximum values for a skewed distribution, etc.), and similarly, the three travel times are associated with an appropriate probability distribution.

For trip segments that are not based on a timetable (e.g., traveling by car, walking, etc.), the travel times are based on a plurality of factors such as the time and date (i.e., the calendrical time), weather, traffic, etc. As in the case of timetable entries, travel times for trip segments that are not based on a timetable are also assigned low, middle, and high values with appropriate probabilities or weightings.

For the purposes of this specification, the term "calendrical time" is defined as indicative of one or more of the following:

(i) a time (e.g., 16:23:58, etc.), (ii) one or more temporal designations (e.g., Tuesday, Novemeber, etc.), (iii) one or more events (e.g., Thanksgiving, John's birthday, etc.), and (iv) a time span (e.g., 8:00–9:00, etc.).

The illustrative embodiment comprises: (a) receiving a desired time-of-arrival; and (b) selecting one of a plurality of entries of a timetable based on: (i) the current time, (ii) said desired time-of-arrival, and (iii) a non-negative penalty function; wherein each of said entries comprises: (i) a scheduled time-of-departure, and (ii) a value that indicates a scheduled time-of-arrival; and wherein said penalty function is: (i) monotonically increasing in travel time T, wherein T equals the difference between an actual time-of-arrival and an actual time-of-departure, (ii) monotonically increasing in $\Delta$=(said actual time-of-arrival minus said desired time-of-arrival) over at least one interval $(\Delta_1, \Delta_2)$ of $\Delta$ wherein $\Delta_2>\Delta_1\geqq 0$, and (iii) monotonically decreasing in A over at least one interval $(\Delta_3, \Delta_4)$ of $\Delta$ wherein $\Delta_3<\Delta_4<0$.

BRIEF DESCRIPTION OF THE DRAWINGS

FIG. 1 depicts the salient portions of an exemplary timetable in the prior art.

FIG. 2 depicts the salient portions of an exemplary augmented timetable in accordance with the illustrative embodiment of the present invention.

DETAILED DESCRIPTION

FIG. 2 depicts the salient portions of exemplary timetable 200 in accordance with the illustrative embodiment of the present invention. As shown in FIG. 2, each time entry for Red Bank in timetable 100 has been expanded in timetable 200 to three values representing early, expected, and late times. Furthermore, each time entry for Madison Square Garden in timetable 100 has been converted to a travel time (i.e., the difference of the corresponding Madison Square Garden and Red Bank entries of timetable 100), and has been augmented to three values representing short, expected, and long travel times.

The illustrative embodiment of the present invention employs a penalty function comprising three terms that quantifies the "cost" or "penalty" of a particular trip:

the first term assesses a cost based on the total travel time the second term applies a penalty when the user arrives late the third term applies a penalty when the user arrives early The following notation is used in the penalty function of the illustrative embodiment:

$t_a$: actual time-of-arrival $t_a$: desired time-of-arrival $t_d$: actual time-of-departure In the illustrative embodiment, the first term of the penalty function, denoted $f_1$, is an equation of the form:

$$f_1(t_a, t_d)=c_1(t_a-t_d)^m \quad \text{(Eq. 1)}$$

where $c_1$ and n are positive constants.

Figure 3:
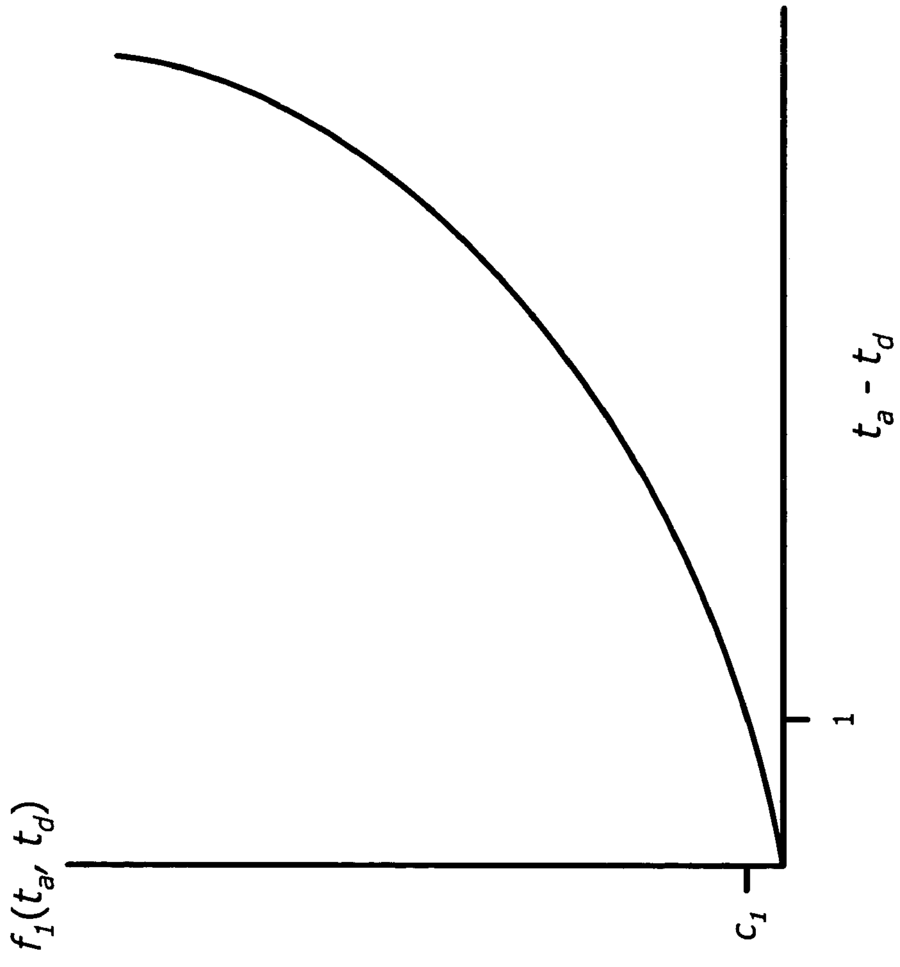
FIG. 3 depicts an exemplary graph of a first penalty function term, in accordance with the illustrative embodiment of the present invention.

Equation 1 is depicted graphically in FIG. 3 for two exemplary instantiations of constants $c_1$ and m. As will be appreciated by those skilled in the art, the particular choices of $c_1$ and m might depend on a variety of factors such as the mode of travel (e.g., m=1 might be appropriate for a pleasant ferry ride, m=1.5 might be appropriate for a less-pleasant train ride, etc.), a user's tolerance for longer trips, etc. Furthermore, it will be clear to those skilled in the art that Equation 1 is merely exemplary, and that in some other embodiments an alternative function that is monotonically non-decreasing in $(t_a-t_d)$ might be employed in lieu of Equation 1.

In the illustrative embodiment, the second term of the penalty function, denoted $f_2$, is an equation of the form:

$$f_2(t_a)=u_0(t_a-t_a^*)\cdot[c_2+c_3\cdot\min(t_a-t_a^*, c_4)^n] \quad \text{(Eq. 2)}$$

where $c_2$, $c_3$, $c_4$, and n are positive constants, and $u_0$ is the unit step function, as is well-known in the art.

Figure 4:
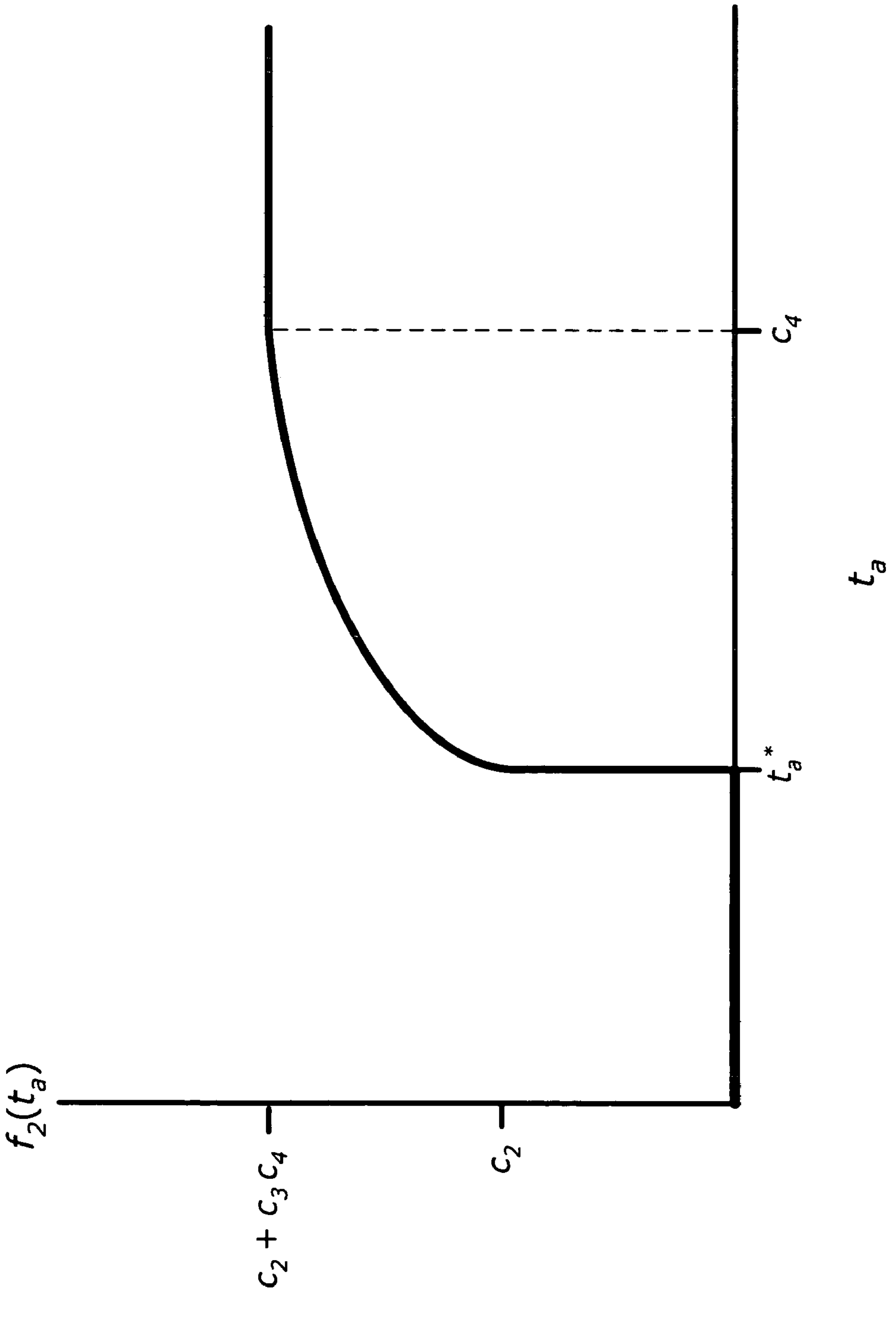
FIG. 4 depicts an exemplary graph of a second penalty function term, in accordance with the illustrative embodiment of the present invention.

Equation 2 is depicted graphically in FIG. 4 for an exemplary instantiation of constants $c_2$, $c_3$, $c_4$, and n. As shown in FIG. 4, penalty term $f_2$ applies only when the user arrives late, and comprises (i) a constant penalty $c_2$ plus (ii) a variable penalty that depends on how late the user arrives. In the illustrative embodiment, the variable penalty grows in $t_a-t_a^*$, the quantity of time that the user is late, up to a maximum reached when $t_a-t_a^*\geqq c_4$. The motivation for the maximum is that once the user is late by a certain amount of time, the penalty does not get any worse (e.g., arriving 110 minutes late for a concert is essentially just as bad as arriving 100 minutes late, etc.). In the example of FIG. 4, exponent n is less than 1, reflecting the fact that the penalty decelerates as the amount of time the user is late increases; as will be appreciated by those skilled in the art, in some embodiments exponent n could be greater than 1. Furthermore, it will be clear to those skilled in the art that Equation 2 is merely exemplary, and that in some other embodiments an alternative function that is monotonically non-decreasing in $(t_a-t_a^*)$ might be employed in lieu of Equation 2 (e.g., a function that does not limit the late penalty, etc.).

In the illustrative embodiment, the third term of the penalty function, denoted $f_3$, is an equation of the form:

$$f_3(t_a)=u_0(t_a^*-t_a-c_5)\cdot(t_a-t_a^*-c_5)^k \quad \text{(Eq. 3)}$$

where $c_5$ and k are positive constants.

Figure 5:
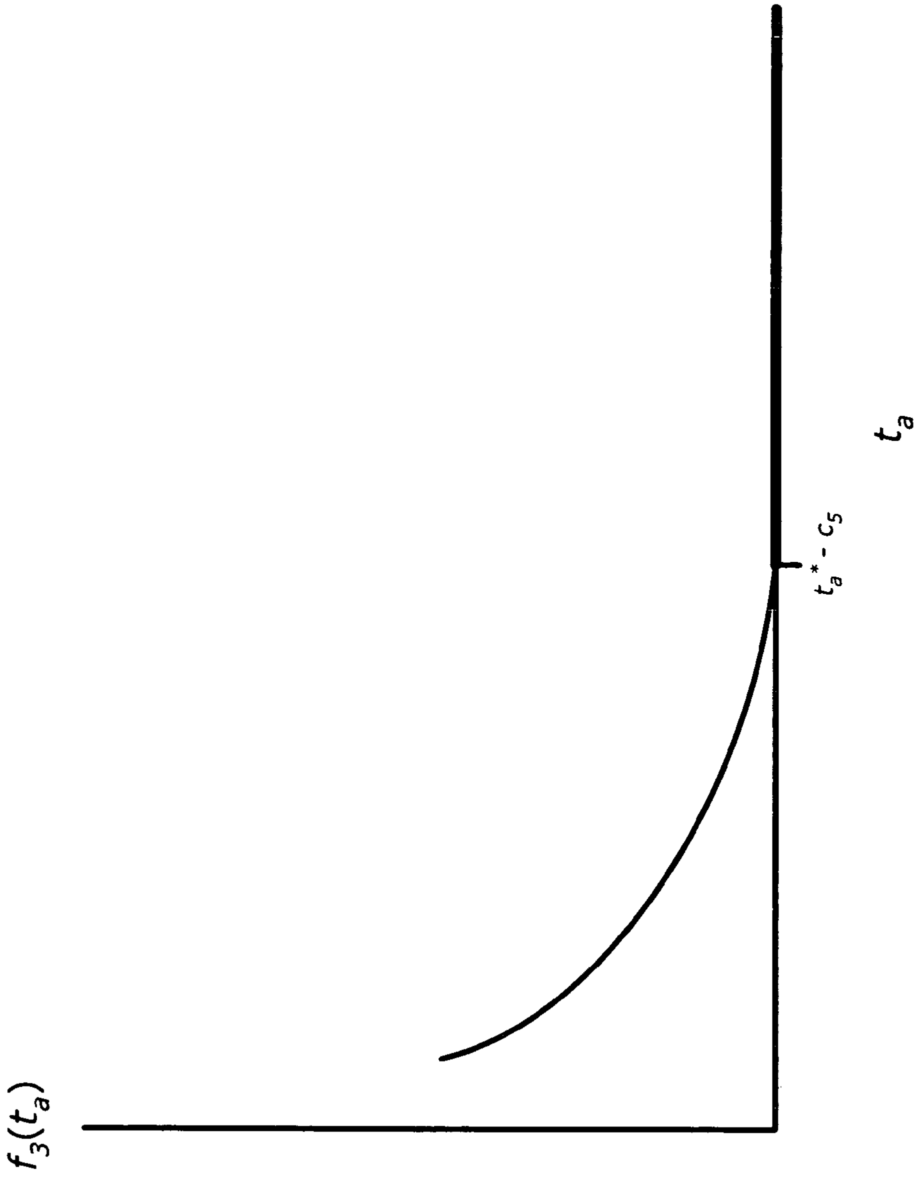
FIG. 5 depicts an exemplary graph of a third penalty function term, in accordance with the illustrative embodiment of the present invention.

Equation 3 is depicted graphically in FIG. 5 for an exemplary instantiation of constants $c_5$ and k. As shown in FIG. 5, penalty term $f_3$ applies only when the user arrives more than $c_5$ units of time (e.g., minutes, etc.) late, thus reflecting the fact that in general it is not undesirable for the user to arrive early up to a point, after which the penalty increases with how early the user arrives. In the example of FIG. 5, k=2 is selected to indicate that the inconvenience of arriving too early rises quadratically; as will be appreciated by those skilled in the art, in some embodiments exponent k might equal some value other than 2 that more accurately penalizes arriving too early. Furthermore, it will be clear to those skilled in the art that Equation 3 is merely exemplary, and that in some other embodiments an alternative function that is monotonically non-increasing in $(t_a-t_a^*)$ might be employed in lieu of Equation 3 (e.g., a function that limits the early penalty to a maximum, etc.).

Figure 6:
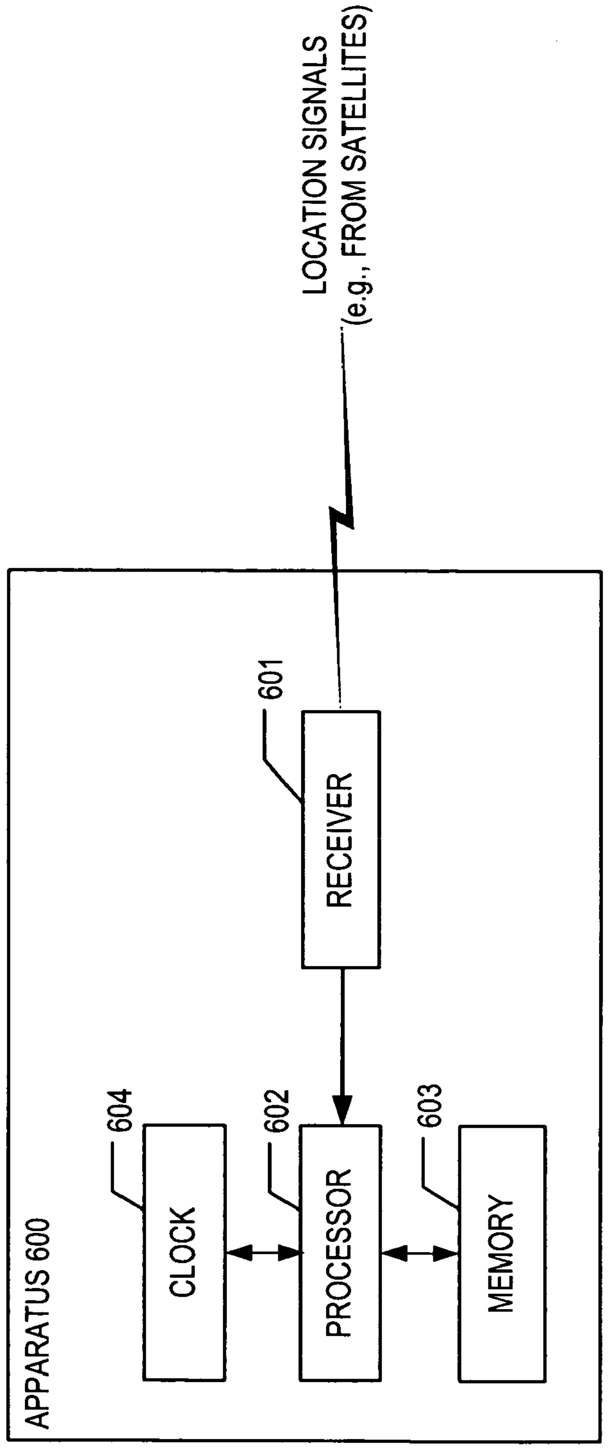
FIG. 6 depicts a block diagram of the salient components of an apparatus for executing the flowcharts of FIG. 7 and FIG. 8, in accordance with the illustrative embodiment of the present invention.

FIG. 6 depicts a block diagram of the salient components of mobile device 600 for executing the flowcharts of FIG. 7 and FIG. 8, described below, in accordance with the illustrative embodiment of the present invention. As shown in FIG. 6, mobile device 600 comprises receiver 601, processor 602, memory 603, and clock 604, interconnected as shown.

Receiver 601 receives signals from which processor 602 can estimate the location of apparatus 600, as described below. As will be appreciated by those skilled in the art, in some embodiments receiver 601 might be a Global Positioning System (GPS) receiver that receives satellite radio signals, while in some other embodiments receiver 601 might receive terrestrial radio signals that can be used to derive location.

Processor 602 is a general-purpose processor that is capable of: executing instructions stored in memory 603, reading data from and writing data into memory 603, determining a location based on signals received by receiver 601, generating outputs, and executing the tasks described below and with respect to FIGS. 7 and 8. In some alternative embodiments of the present invention, processor 602 might comprise one or more special-purpose processors (e.g., a dedicated processor for selecting a departure time, a dedicated processor for determining a location from GPS signals, etc.). In either case, it will be clear to those skilled in the art, after reading this disclosure, how to make and use processor 602.

Memory 603 stores data and executable instructions, as is well-known in the art, and might be any combination of random-access memory (RAM), flash memory, disk drive, etc.

Clock 604 transmits the current date and time to processor 602 in well-known fashion.

Although the illustrative embodiment employs the architecture of FIG. 6, it will be clear to those skilled in the art how to make and use alternative architectures (e.g., a "client/server" architecture in which a processor at a remote server determines the departure time and communicates the result to mobile device 600, etc.) In addition, as will be clear to those skilled in the art after reading the descriptions of FIGS. 7 and 8 below, the location-based functionality of the apparatus of the illustrative embodiment (i.e., receiver 601) is relevant only for the method of FIG. 8 (issuing trip status notifications to a user in transit), and not FIG. 7 (selecting an advantageous departure time for a trip), and thus the method of FIG. 7 can be performed by an apparatus that lacks any location-based capability.

Figure 7:
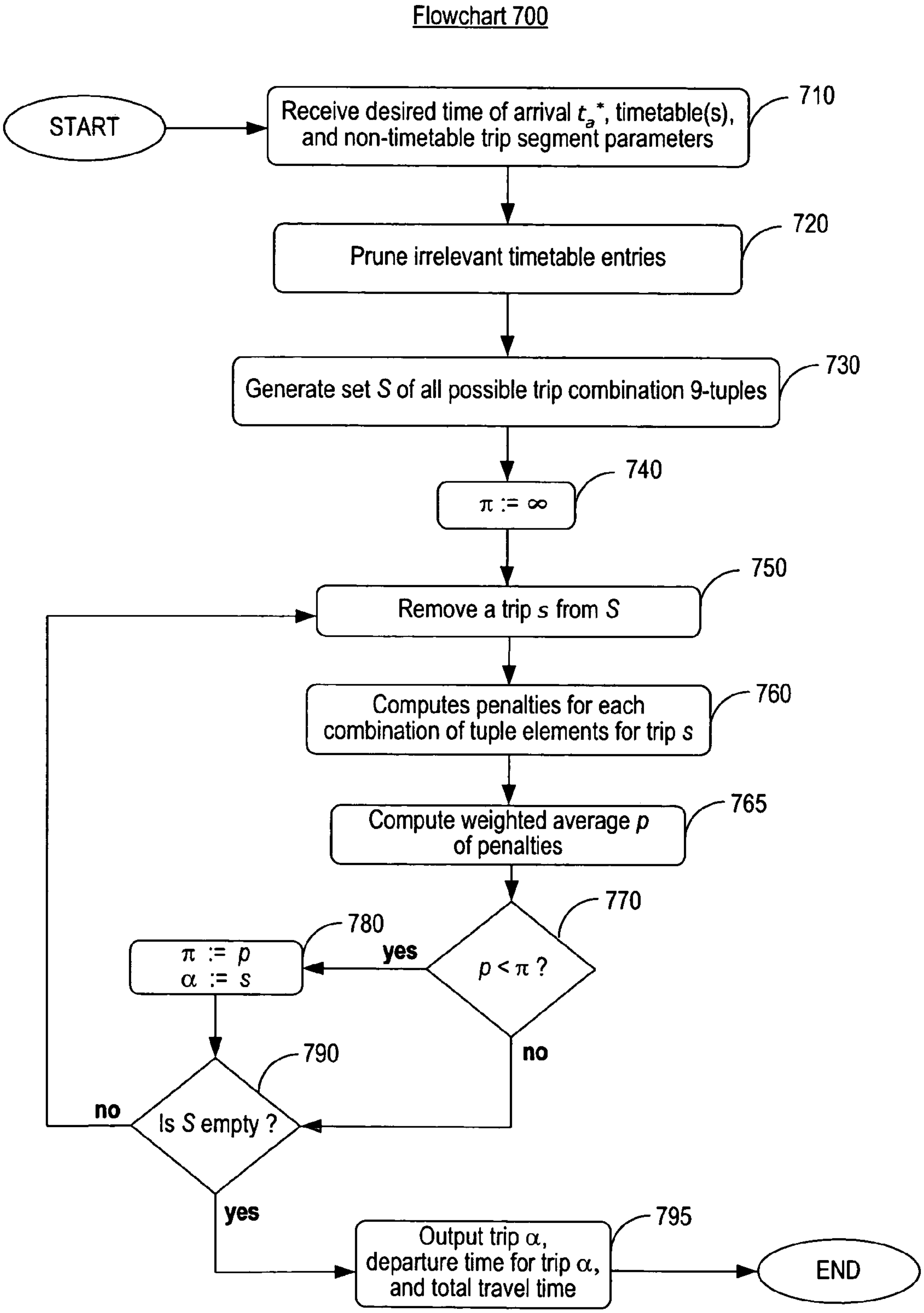
FIG. 7 depicts a flowchart for selecting a departure time, in accordance with the illustrative embodiment of the present invention.

FIG. 7 depicts flowchart 700 for selecting a departure time, in accordance with the illustrative embodiment of the present invention.

At task 710, processor 602 receives desired time of arrival $t_a^*$, timetable(s) for appropriate trip segments, and appropriate parameters for non-timetable trip segments (e.g., minimum and maximum travel times for uniform distributions, mean and variance for normal distributions, etc.).

At task 720, processor 602 prunes irrelevant entries from the timetable(s) (e.g., entries for a 1-hour trip segment with departure times later than the desired time of arrival $t_a^*$, etc.).

At task 730, processor 602 generates a set S of all possible trip combinations, where each member of S is a sequence of trip segments, and wherein each timetable-based trip segment is associated with a 9-tuple corresponding to the three departure times and three travel times associated with a timetable entry, and wherein each non-timetable trip segment is associated with a tuple containing the appropriate parameters received at task 710. For example, the first entry in the timetable of FIG. 2 is represented by the 9-tuple (6:03–7:15, 6:03–7:17, 6:03–7:26, 6:05–7:17, 6:05–7:19, 6:05–7:28, 6:07–7:19, 6:07–7:21, 6:07–7:30). Similarly, a non-timetable trip segment might have parameter set (minimum, maximum) or (mean-$\sigma$, mean, mean+$\sigma$) as appropriate.

At task 740, processor 602 sets variable n to infinity.

At task 750, processor 602 removes a trip s from set S.

At task 760, processor 602 computes penalties for each combination of tuple elements for trip s, in accordance with Equations 1 through 3.

At task 765, processor 602 computes a weighted average p of the penalties computed at task 760, using appropriate weights (e.g., equal weights for a uniform distribution, [0.16, 0.68, 0.16] for a normal distribution, etc.).

At task 770, processor 602 tests whether weighted average p is less than $\pi$, which is the smallest penalty of trips examined so far. If p is less than $\pi$, then execution continues at task 780, otherwise execution continues at task 790.

At task 780, processor 602 stores value p in variable $\pi$, and stores trip s in variable $\alpha$.

At task 790, processor 602 tests whether set S is empty. If S is not empty, then execution continues back at task 750, otherwise execution continues at task 795.

At task 795, processor 602 outputs trip a, the departure time for trip a, and the total travel time for trip $\alpha$. After task 795, the method of flowchart 700 terminates.

As described above, although in the illustrative embodiment the tasks of flowchart 700 are executed by processor 602 of mobile device 600, it will be clear to those skilled in the art how to make and use alternative embodiments of the present invention in which a processor of another entity (e.g., an Internet server, a wireless access point, a wireless switching center, etc.) performs some or all of the tasks of flowchart 700.

Furthermore, it will be appreciated by those skilled in the art that in some embodiments it might be desirable to incorporate additional features into the method of FIG. 7:

- Dynamic information handling (e.g., changes in travel conditions, timetables, desired arrival time and/or place [for example, due to the rescheduling of a meeting], etc.)
- Importing information from data sources (e.g., a user's calendar from a Personal Information Manager (PIM) application, etc.)
- Weights in the penalty function to reflect preferences or cost constraints (e.g., public transportation routes where the return trip is not possible, logistics [such as refilling a car's gas tank], climbing stairs, etc.)
- "What if" scenarios that enable a user to test various departure points and times
- Detailed trip reports (e.g., total distance and time walking, driving, etc.)

It will be clear to those skilled in the art how to incorporate such features into the illustrative embodiment.

Figure 8:
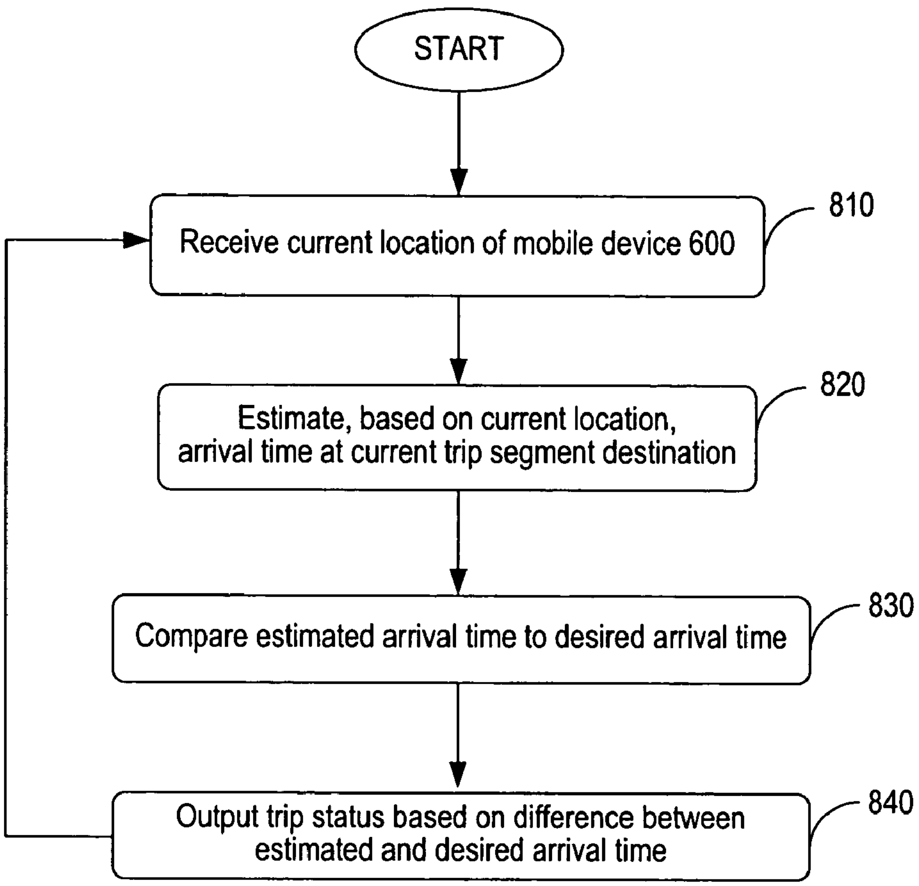
FIG. 8 depicts a flowchart for generating a trip status notification, in accordance with the illustrative embodiment of the present invention.

FIG. 8 depicts flowchart 800 for generating a trip status notification, in accordance with the illustrative embodiment of the present invention.

At task 810, processor 602 receives the current location of mobile device 600 from receiver 601. As will be appreciated by those skilled in the art, in some embodiments processor 602 might actually receive raw data from receiver 601 and compute location based on the data.

At task 820, processor 602 estimates, based on the current location, the user's arrival time at the destination of the current trip segment. A method for estimating the arrival time is disclosed in U.S. patent application Ser. No. 10/287151, entitled "Intelligent Trip Status Notification," which is incorporated by reference.

At task 830, processor 602 compares the arrival time estimated at task 820 to the desired arrival time at the destination of the current trip segment.

At task 840, processor 602 outputs a trip status notification (e.g., a visual notification, an audible notification, etc.) based on the difference between the estimated and desired arrival times. Such notifications might include a graphical gauge that is continuously displayed and updated, a warning message that is displayed when the difference exceeds a threshold, a warning beep, etc. As will be appreciated by those skilled in the art, in some embodiments it might be desirable to issue in advance alerts that indicate required changes to a scheduled trip (e.g., "If you don't leave now, you will miss the express train and will risk arriving late", etc.).

After completion of task 840, execution continues back at task 810. As will be appreciated by those skilled in the art, in some embodiments it might be advantageous to wait for a specified time period before proceeding to task 810.

As described above, although in the illustrative embodiment the tasks of flowchart 800 are all executed by processor 602 of mobile device 600, it will be clear to those skilled in the art how to make and use alternative embodiments of the present invention in which some or all of the tasks of flowchart 800 are executed by a processor of another device (e.g., an Internet server, a wireless access point, a wireless switching center, etc.).

As will be appreciated by those skilled in the art, the methods of the illustrative embodiment could be used as the basis for new software applications (e.g., selecting an advantageous meeting place and time for a plurality of users based on the users' schedules [or current locations] and weights reflecting the relative importance of users; selecting advantageous modes of transportation for one or more trip segments; etc.).

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method comprising:

(a) receiving a desired time-of-arrival;

(b) selecting one of a plurality of entries of a timetable based on:

(i) the current time, (ii) said desired time-of-arrival, and (iii) a non-negative penalty function;

wherein each of said entries comprises:

(i) a scheduled time-of-departure, and (ii) a value that indicates a scheduled time-of-arrival; and wherein said penalty function is:

(i) monotonically increasing in travel time, wherein said travel time equals the difference between an actual time-of-arrival and an actual time-of-departure, (ii) monotonically increasing in $\Delta$=(said actual time-of-arrival minus said desired time-of-arrival) over at least one interval ($\Delta_1$, $\Delta_2$) of $\Delta$ wherein $\Delta_2>\Delta_1\geqq 0$, and (iii) monotonically decreasing in $\Delta$ over at least one interval ($\Delta_3$, $\Delta_4$) of $\Delta$ wherein $\Delta_3>\Delta_4\leqq 0$ and (c) determining a desired departure time based upon the selected one entry.

2. The method of claim 1 wherein each of said entries also comprises:

(iii) a first metric for said scheduled time-of-departure, and (iv) a second metric for said scheduled time-of-arrival; and wherein said penalty function is based on said first metric and on said second metric.

3. The method of claim 2 wherein each of said first metric and said second metric is selected from the group consisting of: a mean value; a minimum value; a maximum value; a variance; an nth-order moment, wherein n is an integer greater than 2; and a probability distribution.

4. The method of claim 1 wherein said timetable is associated with a departure location, said method further comprising:

(c) receiving a current location;

(d) estimating a metric of travel time from said current location to said departure location; and (e) determining whether to output a signal based on:

(i) said current time, (ii) the scheduled time-of-departure of the entry selected at (b), and (iii) said metric estimated at (d).

5. The method of claim 4 wherein said metric estimated at (d) is selected from the group consisting of: a mean value; a minimum value; a maximum value; a variance; an nth-order moment, wherein n is an integer greater than 2; and a probability distribution.

6. A method comprising:

(a) receiving a desired time-of-arrival associated with a destination location;

(b) selecting one of a plurality of entries of a timetable, wherein said timetable is associated with a discharge location, based on:

(i) a current time, (ii) said desired time-of-arrival, (iii) a first metric of estimated travel time from said discharge location to said destination location, and (iv) a non-negative penalty function;

wherein each of said entries comprises:

(i) a scheduled time-of-departure, and (ii) a value that indicates a scheduled time-of-arrival; and wherein said penalty function is:

(i) monotonically increasing in travel time, wherein said travel time equals the difference between an actual time-of-arrival at said destination location and an actual time-of-departure, (ii) monotonically increasing in $\Delta$=(said actual time-of-arrival at said destination location minus said desired time-of-arrival at said destination location) over at least one interval ($\Delta_1$, $\Delta_2$) of $\Delta$ wherein $\Delta_2>\Delta_1\geqq 0$, and (iii) monotonically decreasing in $\Delta$ over at least one interval ($\Delta_3$, $\Delta_4$) of $\Delta$ wherein $\Delta_3>\Delta_4\leqq 0$ and (c) determining a desired departure time based upon the selected one entry.

7. The method of claim 6 wherein each of said entries also comprises:

(iii) a second metric for said scheduled time-of-departure, and (iv) a third metric for said scheduled time-of-arrival; and wherein said penalty function is based on said second metric and on said third metric.

8. The method of claim 7 wherein each of said second metric and said third metric is selected from the group consisting of: a mean value; a minimum value; a maximum value;

a variance; an nth-order moment, wherein n is an integer greater than 2; and a probability distribution.

9. The method of claim 6 wherein said timetable is associated with a departure location, said method further comprising:

(c) receiving a current location;

(d) estimating a second metric of travel time from said current location to said departure location; and (e) determining whether to output a signal based on:
(i) said current time,
(ii) the scheduled time-of-departure of the entry selected at (b), and
(iii) said second metric.

10. The method of claim 9 wherein said second metric is selected from the group consisting of: a mean value; a minimum value; a maximum value; a variance; an nth-order moment, wherein n is an integer greater than 2; and a probability distribution.

11. A method comprising:
(a) receiving a desired time-of-arrival associated with a destination location;
(b) selecting one of a plurality of entries of a first timetable and one of a plurality of entries of a second timetable, wherein said first timetable is associated with a first discharge location, and wherein said second timetable is associated with a second departure location and a second discharge location, and wherein said selecting is based on:
(i) the current time,
(ii) said desired time-of-arrival,
(iii) a first metric of estimated travel time from said first discharge location to said second departure location,
(iv) a second metric of estimated travel time from said second discharge location to said destination location, and
(v) a non-negative penalty function;
wherein each of said entries of said first timetable and of said second timetable comprises:
(i) a scheduled time-of-departure, and
(ii) a value that indicates a scheduled time-of-arrival; and
wherein said penalty function is:
(i) monotonically increasing in travel time, wherein said travel time equals the difference between an actual time-of-arrival at said destination location and an actual time-of-departure,
(ii) monotonically increasing in $\Delta$=(said actual time-of-arrival at said destination location minus said desired time-of-arrival at said destination location) over at least one interval ($\Delta_1$, $\Delta_2$) of $\Delta$ wherein $\Delta_2 > \Delta_1 \geqq 0$, and
(iii) monotonically decreasing in $\Delta$ over at least one interval ($\Delta_3$, $\Delta_4$) of $\Delta$ wherein $\Delta_3 > \Delta_4 \leqq 0$ and
(c) determining a desired departure time based upon the selected one entry from both the first time table the second timetable.

12. The method of claim 11 wherein each of said entries of said first timetable and of said second timetable also comprises:
(iii) a third metric for said scheduled time-of-departure, and
(iv) a fourth metric for said scheduled time-of-arrival; and
wherein said penalty function is based on said third metric and said fourth metric.

13. The method of claim 12 wherein each of said third metric and said fourth metric is selected from the group consisting of: a mean value; a minimum value; a maximum value; a variance; an nth-order moment, wherein n is an integer greater than 2; and a probability distribution.

14. The method of claim 11 wherein said first timetable is also associated with a first departure location, said method further comprising:
(c) receiving a current location;
(d) estimating a third metric of travel time from said current location to said first departure location; and
(e) determining whether to output a signal based on:
(i) said current time,
(ii) the scheduled time-of-departure of the entry of said first timetable selected at (b), and
(iii) said third metric.

15. The method of claim 14 wherein said second metric is selected from the group consisting of: a mean value; a minimum value; a maximum value; a variance; an nth-order moment, wherein n is an integer greater than 2; and a probability distribution.

16. An apparatus comprising:
a receiver for receiving a desired time-of-arrival; and
a processor for selecting one of a plurality of entries of a timetable based on:
(i) a the current time,
(ii) said desired time-of-arrival, and
(iii) a non-negative penalty function;
wherein each of said entries comprises:
(i) a scheduled time-of-departure, and
(ii) a value that indicates a scheduled time-of-arrival; and
wherein said penalty function is:
(i) monotonically increasing in travel time, wherein said travel time equals the difference between an actual time-of-arrival and an actual time-of-departure,
(ii) monotonically increasing in $\Delta$=(said actual time-of-arrival minus said desired time-of-arrival) over at least one interval ($\Delta_1$, $\Delta_2$) of $\Delta$ wherein $\Delta_2 > \Delta_1 \geqq 0$, and
(iii) monotonically decreasing in $\Delta$ over at least one interval ($\Delta_3$, $\Delta_4$) of $\Delta$ wherein $\Delta_3 < \Delta_4 \leqq 0$ and for determining a desired departure based upon the selected one entry.

17. The apparatus of claim 16 wherein each of said entries also comprises:
(iii) a first metric for said scheduled time-of-departure, and
(iv) a second metric for said scheduled time-of-arrival; and
wherein said penalty function is based on said first metric and on said second metric.

18. The apparatus of claim 16 wherein said timetable is associated with a departure location, and wherein said receiver is also for receiving a current location, and wherein said processor is also for:
estimating a metric of travel time from said current location to said departure location; and
determining whether to output a signal based on:
(i) said current time,
(ii) the scheduled time-of-departure of the entry selected, and
(iii) said metric.

19. An apparatus comprising:
a receiver for receiving a desired time-of-arrival associated with a destination location; and
a processor for selecting one of a plurality of entries of a timetable, wherein said timetable is associated with a discharge location, based on:
(i) a current time,
(ii) said desired time-of-arrival,
(iii) a first metric of estimated travel time from said discharge location to said destination location, and (iv) a non-negative penalty function;

wherein each of said entries comprises:

(i) a scheduled time-of-departure, and (ii) a value that indicates a scheduled time-of-arrival; and wherein said penalty function is:

(i) monotonically increasing in travel time, wherein said travel time equals the difference between an actual time-of-arrival at said destination location and an actual time-of-departure, (ii) monotonically increasing in $\Delta$=(said actual time-of-arrival at said destination location minus said desired time-of-arrival at said destination location) over at least one interval ($\Delta_1$, $\Delta_2$) of $\Delta$ wherein $\Delta_2 > \Delta_1 \geqq 0$, and (iii) monotonically decreasing in $\Delta$ over at least one interval ($\Delta_3$, $\Delta_4$) of $\Delta$ wherein $\Delta_3 > \Delta_4 \leqq 0$ and for determining a desired departure time based upon the selected one entry.

20. The apparatus of claim 19 wherein each of said entries also comprises:

(iii) a second metric for said scheduled time-of-departure, and (iv) a third metric for said scheduled time-of-arrival; and wherein said penalty function is based on said second metric and on said third metric.

* * * * *